(12) United States Patent
Ross et al.

(10) Patent No.: US 7,903,631 B2
(45) Date of Patent: Mar. 8, 2011

(54) MESH-TO-CLUSTER PROTOCOL

(75) Inventors: John Anderson Fergus Ross, Niskayuna, NY (US); Nick Andrew Van Stralen, Ballston Lake, NY (US); Amit Bhavanishankar Kulkarni, Clifton Park, NY (US); Michael James Hartman, Clifton Park, NY (US)

(73) Assignee: Lockheed Martin Corporation, Bethesda, MD (US)

(*) Notice: Subject to any disclaimer, the term of this patent is extended or adjusted under 35 U.S.C. 154(b) by 566 days.

(21) Appl. No.: 11/701,364

(22) Filed: Feb. 2, 2007

(65) Prior Publication Data
US 2008/0189394 A1    Aug. 7, 2008

(51) Int. Cl.
*H04J 3/24* (2006.01)

(52) U.S. Cl. ............... 370/349; 370/310.2; 370/328; 370/338; 370/334; 370/389; 455/422.1; 455/443; 455/444; 455/446; 455/41.2

(58) Field of Classification Search .......... 370/338, 370/395.31, 310, 349, 310.2, 328, 334, 339, 370/345, 389, 315, 329, 326, 327, 322; 455/435, 455/422, 443, 11.1, 13.1, 13.3, 41.2, 552.1, 455/553.1, 562.1, 556.1, 95, 151.2, 422.1, 455/444, 446–452.1, 455, 464, 509, 127.4; 375/259

See application file for complete search history.

(56) References Cited

U.S. PATENT DOCUMENTS

| 7,596,152 | B2* | 9/2009 | Yarvis et al. | 370/503 |
|---|---|---|---|---|
| 2002/0019228 | A1* | 2/2002 | McKenna et al. | 455/435 |
| 2004/0052227 | A1* | 3/2004 | Judd et al. | 370/334 |
| 2004/0156345 | A1* | 8/2004 | Steer et al. | 370/338 |
| 2005/0113084 | A1* | 5/2005 | Scaglione et al. | 455/426.2 |
| 2005/0117530 | A1* | 6/2005 | Abraham et al. | 370/310 |
| 2006/0083319 | A1* | 4/2006 | Giannakis et al. | 375/259 |
| 2007/0026807 | A1* | 2/2007 | Kish | 455/63.4 |

OTHER PUBLICATIONS

Cover, T.M. and Thomas, J.A., *Elements of Information Theory*, New York: John Wile & Sons, Chapter 14, 374-458 (1991).
Petrus, P., Reed, J., Rappaport, T., "Effect of Directional Antennas at the Base Station on the Doppler Spectrum", *IEEE Communications Letters*, 1(2): 40-42 (1997).
Durgin, G., Kukshya, V., Rappaport, T., "Wideband Measurements of Angle and Delay Dispresion for Outdoor and Indoor Peer -to-Peer Redio Channels at 1920 MHz", *IEEE Transactins on Antennas and Propagation*, 51(5) 936-944 (2003).
Vanhaverbeke, F., and Moeneclaey, M., *IEE Transactions on Communications*, 53(2), 228-233 (2005).

* cited by examiner

*Primary Examiner* — Kent Chang
*Assistant Examiner* — San Htun
(74) *Attorney, Agent, or Firm* — Nixon & Vanderhye P.C.

(57) ABSTRACT

A system and/or method for relaying messages in a network (e.g. a mobile network) are provided. Certain portable communications nodes are instrumented with omni-directional antennas. Certain static communications nodes are network cluster-head nodes with directional antennas, and, for example, achieve much of the gain possible when all nodes have directional antennas. Cluster-head communications preferably are used when the nodes are separable by the directional antennas. Preferably, there is a transition to mesh communications when the nodes cannot take advantage of the directional antennas. One feature of certain exemplary embodiments is that only one side of a communication link requires a directional antennal to enable spatial frequency reuse.

16 Claims, 4 Drawing Sheets

MESH-TO-CLUSTER PROTOCOL

FIELD OF THE INVENTION

The example embodiments herein relate to systems and/or methods for relaying messages between nodes in a network (e.g. nodes in a wireless network). In particular, the example embodiments herein relate to communications between nodes, where nodes near a static node with a directional antenna communicate using a cluster (cell) protocol, and nodes with omni-directional antennas far from the static node communicate using a mesh protocol. Preferably communications pass through nodes in a transitional region between the cell and mesh regions.

BACKGROUND OF THE INVENTION

Conventionally, designs of communication networks have been limited to one of two approaches. In a first approach, communication protocols for use in mesh networks configure both portable nodes as well as with static nodes to communicate using omni-directional antennas. One example of a mesh protocol is the USAP protocol. FIG. 1 is a conventional communications network wherein all nodes are configured to communicate using only omni-directional antennas. FIG. 1 shows static node Z, and portable nodes A-E. Each link to static node Z from a portable node occupies two signals (e.g. transmit and receive). Thus, a mesh system with only omni-directional antennas requires ten orthogonal signals.

Unfortunately, this approach limits the capacity of mobile networks because, for example, practical communications options depend on orthogonal links (see Cover, Thomas M. and Joy A. Thomas. *Elements of Information Theory*. New York: John Wiley & Sons, 1991; Vanhaverbeke, F. and M. Moeneclaey. "Sum Capacity of Equal-Power Users in Overloaded Channels." *IEEE Transactions Communications* 53.2 (February 2005): pp. 228-33). Such a requirement requires a tradeoff between time and bandwidth. For example, keeping bandwidth constant, for example, in a system where all signals use the same frequency, may require extra time for transmit and receive because the system may cycle through all of the nodes until the appropriate node is found. On the other hand, sending out all of the signals at the same time requires additional bandwidth. Thus, increased capacity in a wholly omni-directional system disadvantageously requires either more time or more bandwidth.

In a second approach, directional antennas may be used to increase the capacity of the system via frequency reuse. FIG. 2 is a conventional communications network with directional antennas disposed at a static node. In FIG. 2, static node Z is equipped with directional antennas, and portable nodes A-E are disposed within the paths of the directional antennas. A network of nodes according to this second approach usually is partitioned into distinct clusters. Each cluster of nodes has a node that acts as a cluster-head. A cluster-head node conventionally controls most, if not all, communication between clusters. In most clustering techniques, a cluster is formed such that all cluster member nodes are within 1 hop of the cluster-head. Therefore access to the cluster-head is critical for efficient network operation.

This arrangement theoretically allows for complete frequency reuse. Thus, static node Z can communicate with five portable nodes A-E over the same frequency at the same time, resulting in a fivefold increase in capacity. When portable nodes A-E are transmitters and static node Z is a receiver, less power is required at the transmitters, which implies, for example, that there is less interference into adjacent regions. With little noise between layers comes the opportunity to reuse bandwidth. Alternatively, this arrangement requires less hops to the destination at the same power level. The mobile fading envelope is less severe, and this reduces contention among signals to Z that can cause bottlenecks. There also may be less multipath (see Durgin, G. D., V. Kukshya, and T. S. Rappaport. "Wideband measurements of angle and delay dispersion for outdoor and indoor peer-to-peer radio channels at 1920 MHz." *IEEE Transactions on Antennas and Propogation* 51.5 (May 2003): 936-944; Petrus, P., J. H. Reed, and T. S. Rappaport. "Effects of directional antennas at the base station on the Doppler spectrum." *IEEE Communications Letters* 1.2 (March 1997): 40-42). Thus, cluster-head convergence results in a system that is quicker under bias. If a given topology is arranged well, a given node is more likely to be in a cluster, so a signal need not go through a mesh to get to a cluster head.

Unfortunately, this second approach also has its disadvantages. For example, it often is not practical to equip all nodes with directional antennas. It also is too restrictive to assume that all nodes will be within the range of directional antennas. Also, problems may arise when multiple nodes are within the path of a single directional antenna. For example, FIG. 3 is an exemplary communications network where two nodes are observable by a single directional antenna. In FIG. 3, portable nodes X and Y are both within the path of the directional antenna of static node Z. Both X and Y may receive and process the message from static node Z. This may result in extraneous messages being relayed through the network, for example, using the limited resources inappropriately.

Thus, it will be appreciated that there is a need in the art for a system and/or method to overcome one or more of these and/or other disadvantages.

SUMMARY OF THE INVENTION

One aspect of the invention relates to a system and/or method that combines omni-directional and directional antennas to provide an efficient network that includes a mesh region, a cluster region, and a transitional region located therebetween.

Certain example embodiments provide a method of sending a message through a network of nodes. Each node in a first subset of nodes includes at least one directional antenna. Each node in a second subset of nodes includes an omni-directional antenna. The method may comprise identifying as a cluster-head each node in the first subset of nodes. Those nodes in the second subset of nodes that are proximate to each cluster-head may be clustered into a cell. A mesh may be created that includes nodes remote from each cluster-head. The message may be sent from a sending node via the cell and/or the mesh in dependence on whether the sending node is a cluster-head type node. According to certain example embodiments, the message may be sent through the cell when the node sending the message is a cluster-head and the node receiving the message is within the cell; and the message may be sent using the mesh when the node sending the message is not a cluster-head or the node receiving the message is not within the cell.

Certain example embodiments provide a system for sending a message through a network of nodes. Such systems may comprise a first subset of nodes. Each node in the first subset of nodes may include at least one directional antenna and be identified as a cluster-head node. Such systems also may comprise a second subset of nodes. Each node in the second subset of nodes may include an omni-directional antenna. At least one cell region may be included. Each cell may comprise a cluster-head node and a cluster of nodes from the second subset of nodes. Each node in the cluster may be proximate to the cluster-head node. At least one mesh region also may be included. The mesh may include nodes remote from each cluster-head. The message may be sent from a sending node via the cell and/or the mesh in dependence on whether the sending node is a cluster-head type node.

Certain other example embodiments provide a system for sending a message through a network of nodes. The network of nodes may comprise at least one cell region and at least one mesh region. Each cell region may include a cluster-head node. The cluster-head node may have at least one directional antenna operable to send and/or receive the message directly to at least one cell node. The at least one cell node may have an omni-directional antenna. The cell region may be capable of being formed in accordance with a clustering algorithm that clusters the at least one cell node around the cluster-head node. Each mesh region may include at least one mesh node operable to send and/or receive a message. The at least one mesh node may have an omni-directional antenna. The at least one mesh node may be located remote from the cluster-head node of the cell region. Each node in the network of nodes may be capable of executing primitives. The primitives may be capable at least of identifying a node to which the message should be sent and whether the message should be sent through the cell region or the mesh region.

Yet other example embodiments provide a system for sending a message through a network of nodes. Each node in a first subset of nodes may include at least one directional antenna. Each node in a second subset of nodes may include an omni-directional antenna. The system may comprise means for identifying as a cluster-head each node in the first subset of nodes; means for clustering into a cell those nodes in the second subset of nodes that are proximate to each cluster-head; means for creating a mesh, the mesh including nodes remote from each cluster-head; and, means for sending the message from a sending node via the cell and/or the mesh based on a type associated with the sending node.

One advantage of certain example embodiments relates to reduced or negligible noise between layers. Another advantage of certain example embodiments relates to a higher probability of successfully reusing bandwidth for adjacent regions (e.g. adjacent layers having little noise therebetween).

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

The decision to implement communications (e.g. satellite communications) through a network need not be a binary choice between either using mesh protocols or cluster protocols. Accordingly, certain example embodiments described herein implement a cluster protocol in near regions and a mesh protocol in outer regions. Preferably, a set of primitives (described in greater detail below) executable by certain nodes (e.g. nodes within a transition region between the mesh and cluster regions) facilitate the change between protocols when a message is transmitted and/or received. Additionally, these and/or other primitives executable by certain nodes may handle exception cases that ordinarily may cause faults in conventional communications protocols (also described below).

1. General Network Layout

Figure 1:
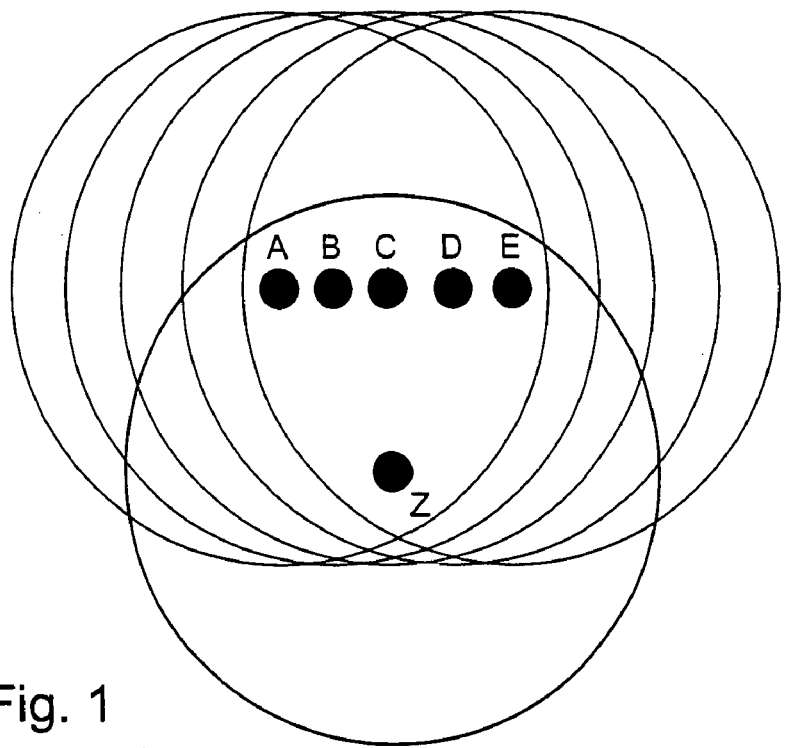
FIG. 1 is a conventional communications network wherein all nodes are configured to communicate using only omni-directional antennas.
Figure 2:
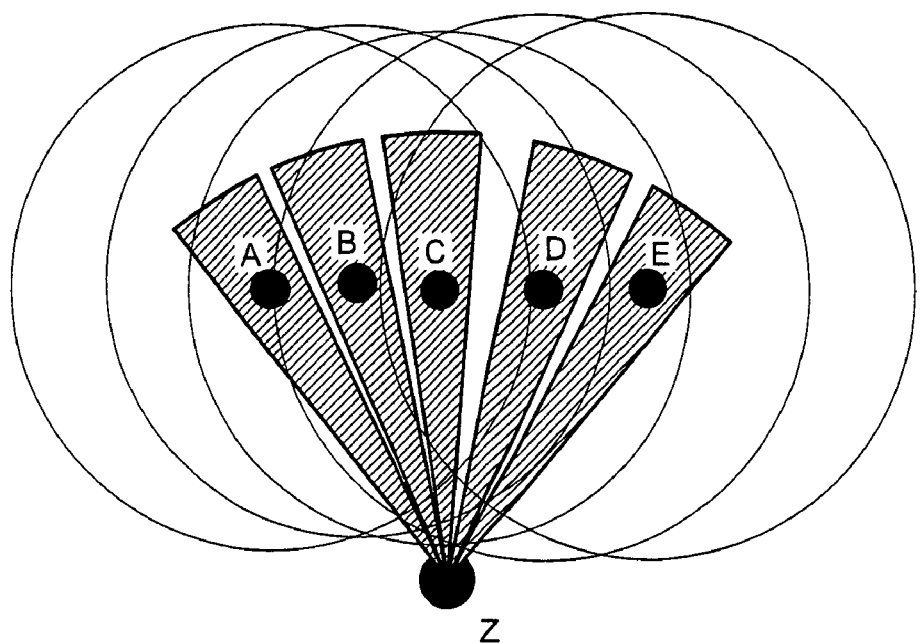
FIG. 2 is a conventional communications network with directional antennas disposed at a static node.
Figure 3:
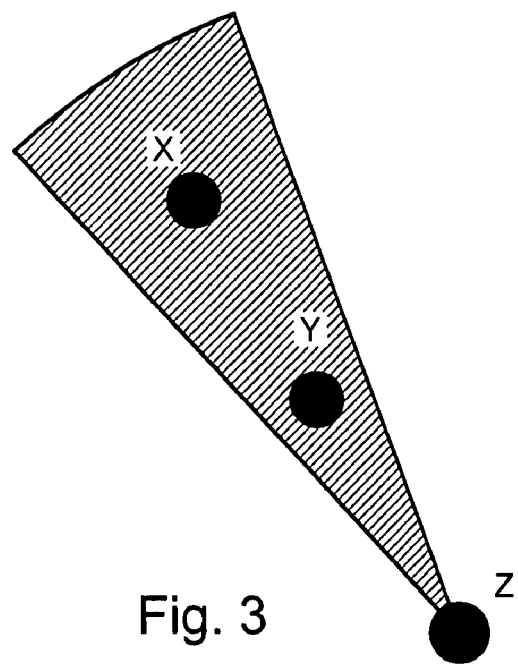
FIG. 3 is an exemplary communications network where two nodes are observable by a single directional antenna.
Figure 4:
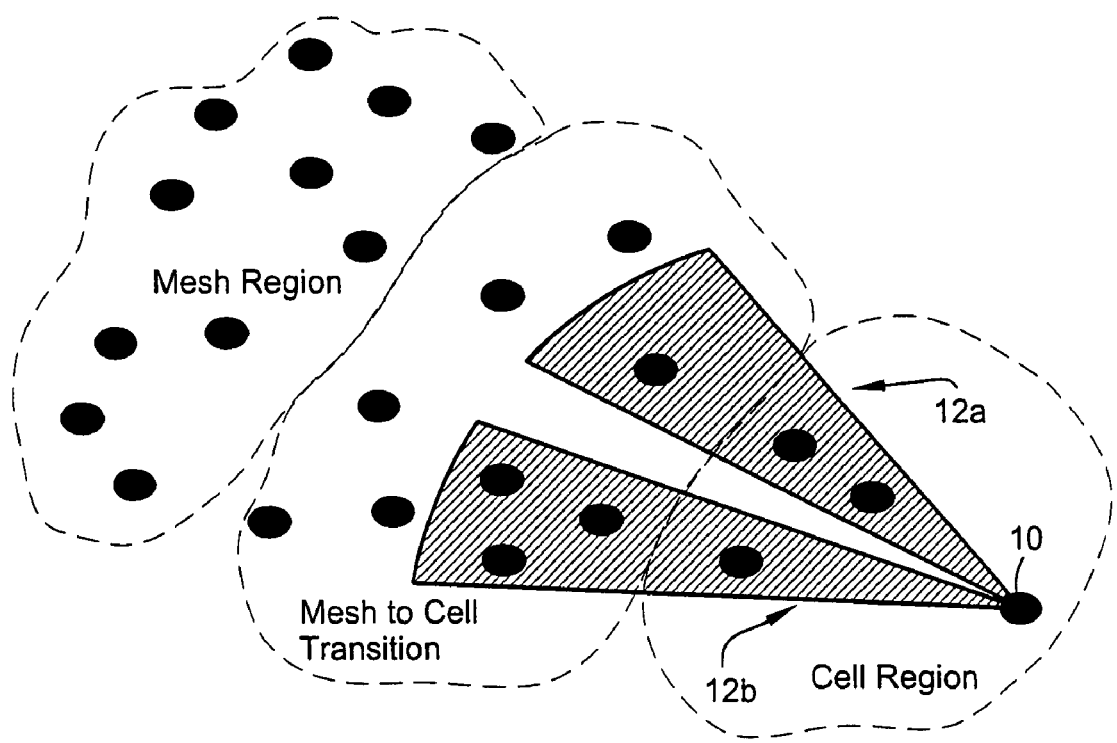
FIG. 4 is an exemplary network showing a mesh region, a cell region, and a transitional region located therebetween.

FIG. 4 is an exemplary network showing a mesh region, a cell region, and a transition region located therebetween. Briefly, a cluster-head node within the cell region is equipped with at least one directional antenna. Preferably, each directional antenna will be configured so as to communicate with only one other node in the cluster; however, it will be appreciated that other nodes may fall within the range of a node, and that nodes that receive the communication inappropriately may ignore it by using, for example, a media access protocol such as carrier sense multiple access.

The cluster-head node 10 may communicate with a node in a transition region. Nodes in this region preferably are equipped with omni-directional antennas, having coverage areas 12a-b. Thus, even though nodes in the transition region may receive communications from within the cluster region, they preferably are equipped to communicate with nodes in a mesh.

Preferably, an omni-directional antenna mesh protocol is employed in the outer regions (e.g. those regions located comparatively far from a cluster-head node and/or outside of the reach of any directional antennas operably connected to a cluster-head node). A set of channels is assigned for outer mesh communication, whereas an alternative set of channels is assigned to the inner region (e.g. those regions located comparatively near to a cluster-head node and/or within the reach of at least one directional antenna operably connected to a cluster-head node). The channels assigned in the outer region may be reused on each antenna beam in the inner region, allowing, for example, for significant gains in capacity in the inner region. For example, a five beam directional beam system in the inner region will increase the capacity five-fold therein. To gain an increase in capacity in the outer region, the nodes with the omni-directional antennas preferably transmit their signals simultaneously. Media access protocols, such as, for example, carrier sense multiple access prevent nodes that "hear" other nodes' communications from communicating themselves.

This type of channel access is supported by adding media access primitives to be used only by nodes with omni-directional antennas. The primitives are described in greater detail below.

2. Network Components and Network Setup

2.1 Cell Region

In the cell region, one or more cluster-head nodes will have at least one directional antenna. Each cluster-head has a cluster of cells associated with it. Each cell, in turn, has at least one node as a member of the cell. In certain contexts (e.g. a satellite context), cluster-head nodes may be fixed, while other nodes may be portable. As noted above, the portable nodes preferably are located within the path(s) of the directional antenna(s) of the cluster-head node. In general, portable nodes may be configured to search for and choose a cluster-head. After portable nodes have joined a cluster, they may take directions and/or respond to commands from the cluster-head. A portable node also may be able to configured to disassociate with a cluster-head if the cluster becomes unavailable. Additionally, as described below, a portable node may be configured to communicate using a mesh protocol, for example, when no cluster-heads are available.

A certain subset of nodes in the network may be configured with at least one directional antenna. Preferably, these nodes will have a plurality of directional antennas to improve efficiency. Equipping the nodes with directional antennas is advantageous because the directional antennas potentially allow for, for example, spectral reuse and further reach of the signals emitted from/received by such antennas. Equipping nodes in this way also may advantageously reduce multipath and reduce RF envelope variations in mobile environments. This is because a narrow-beam antenna may simplify the mobile demodulation problem, potentially providing greater capacity on a single link (see Petrus, P., J. H. Reed, and T. S. Rappaport. "Effects of directional antennas at the base station on the Doppler spectrum." *IEEE Communications Letters* 1.2 (March 1997): 40-42). It will be appreciated that not all nodes will be equipped with directional antennas, at least because of practical considerations associated with such configurations, including, for example, cost, complexity, and the like. However, it also will be appreciated that equipping a small fraction of the total nodes in the network may provide much of the gain typical of a full directional antenna system. It will be appreciated that the ideal ratio of total nodes to cluster-head nodes may depend on a number of factors, such as, for example, the costs associated with equipping directional antennas, beam width of directional antennas, etc. Certain example embodiments may use a ratio of about 100:1, though it will be appreciated that this ratio is given by way of example and without limitation.

The advantages associated with such an arrangement may be realized when a conventional clustering algorithm is modified, generating a cluster bias when selecting as cluster-heads the nodes with multiple directional antennas. Thus, although any clustering algorithm may be implemented when generating the cluster, it is preferable to modify the clustering algorithm to select cluster-heads in this way. For example, a Weighted Clustering Algorithm (WCA) or a Self-Critical Clustering (SCC) protocol can be modified, such that a high weight or bias is given to the node(s) with multiple directional antennas. This ensures that if such a node is present, it is chosen as a cluster-head. It will be appreciated that if such a node is not detected, the clustering algorithm either can select an alternate cluster-head, or it can implement a flat routing protocol. Thus, certain example embodiments may provide efficient topology management as a result of cluster formation. Yet, certain other example embodiments may not require any clustering algorithm, for example, if the cluster were predefined.

Figure 5A:
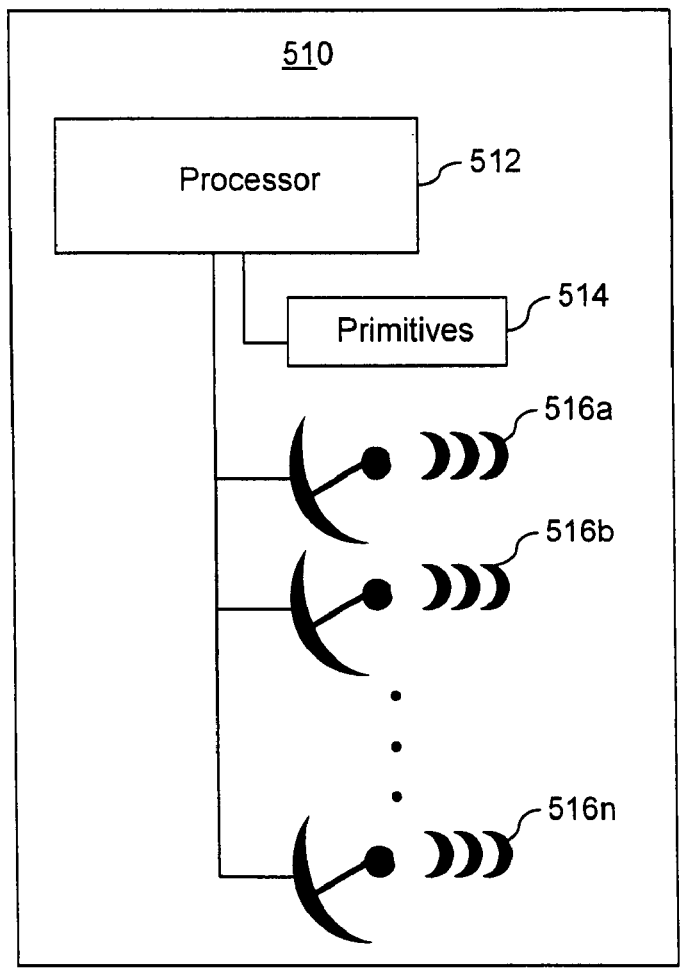
FIG. 5a is a simplified schematic view of an illustrative cluster-head node in accordance with an example embodiment.

FIG. 5a is a simplified schematic view of an illustrative cluster-head node 510 in accordance with an example embodiment. Cluster-head node 510 includes a processor 512. The processor 512 is operable to execute primitives 514, which, for example, may be stored as software, hardware, firmware, or the like. Operably connected to the processor 512 are a number of directional antennas 516a-n. As noted above, the directional antennas allow for significant spectral reuse and confer associated advantages. The primitives 514 may be able to inform the processor 512 of the node's location, as well as whether the next node is within the cell. In certain example embodiments, no modifications need to be made to existing cluster protocols.

2.2 Mesh Region

The outer nodes comprise the mesh region. These outer nodes may be configured to communicate with each other using one or more omni-directional antennas. Communications through the mesh region may be sent using any flat routing protocol. More particularly, any Mobile Adhoc Network (MANET) routing protocol may be used in connection with certain example embodiments (e.g. for satellite communications). For example, protocols such as OLSR, Fisheye, AODV, DSR, and the like may be used in, and/or modified for use with, certain example embodiments. In certain example embodiments, no modifications need to be made to existing mesh protocols.

Figure 5B:
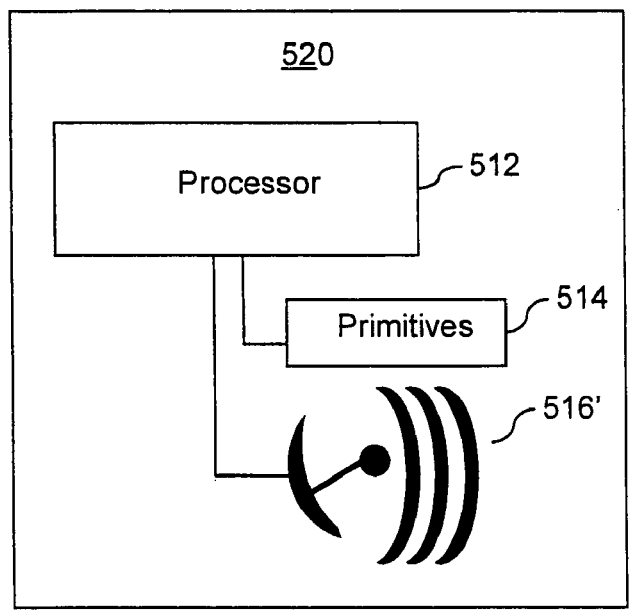
FIG. 5b is a simplified schematic view of an illustrative portable node in accordance with an example embodiment.

FIG. 5b is a simplified schematic view of an illustrative portable node 520 in accordance with an example embodiment. FIG. 5b is similar to FIG. 5a in that the portable node 520 also includes a processor 512 capable of executing primitives 514. However, portable node 520 includes a single omni-directional antenna 516'. For example, a portable node may be deployed in the cluster region, the mesh region, or the transition region, and/or may span one or more regions. Thus, portable nodes may be configured to communicate using either or both of the mesh and cluster protocols.

2.3 Transition Region

Preferably, each node will be aware of where it is located (e.g. within a mesh and/or within a cell). Each node also may be aware of its relationship with other nodes. For example, a given node may be able to determine which other nodes are within the same cell, which nodes are cluster-heads, etc. As noted above, if a node is within a mesh, it may be operable to communicate using a flat routing protocol. However, if the node is also within a cell, it also may be operable to communicate using a cluster protocol.

Thus, if a destination node is within a sending node's cell, the message can be sent directly. However, if it is not within the cell but was received over the mesh protocol, the message may be forwarded to the cluster-head because the destination node must be within another node. The transition region may be defined as the area where a node can communicate directly (e.g. via 1 hop) with a node in a cluster and also can communicate directly (e.g. via 1 hop) with a node not in the cluster. Information about clusterheads may be propagated to other clusterheads, for example, through a global discovery operation, via node exchange, or gossip exchange, etc. In a global discovery operation, clusterheads may periodically broadcast a DISCOVERY request. All nodes that hear the request will reply with the list of clusterheads known to them. In another example embodiment, nodes participating in the clustering operation will exchange information about their known clusterheads with each other. Over time, this information may spread across the network. In yet another example embodiment, clusterheads may obtain information about nearby clusterheads through the previously described mechanism of node exchange. The clusterhead then randomly may choose a subset of its known clusterheads to gossip with, wherein it exchanges its list of known clusterheads with its peers. These operations usually may be implemented in software.

3. Example Implementations of Communications Through the Transition Region

Figure 6A:
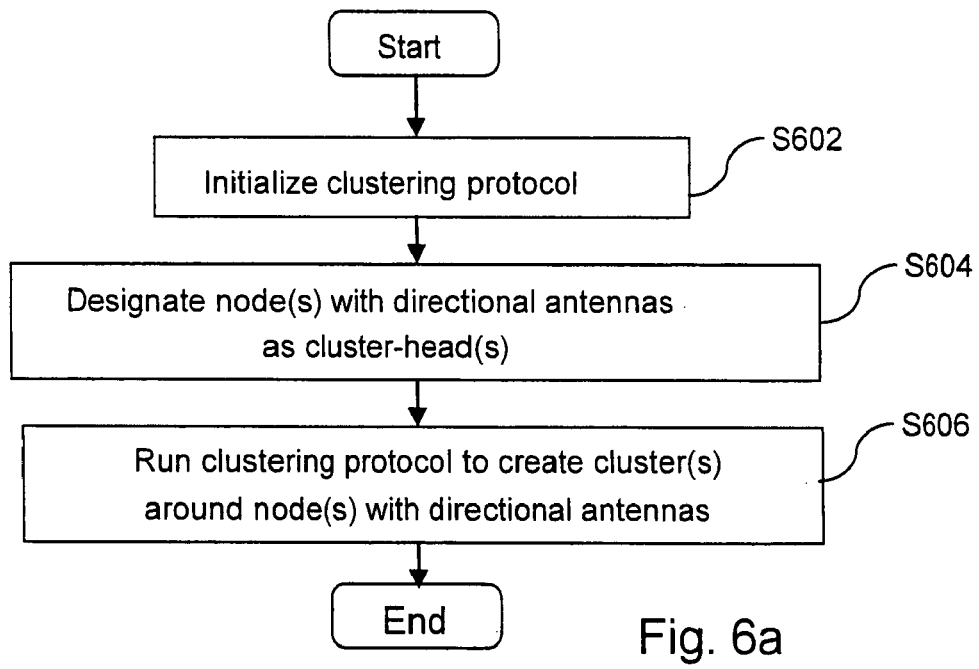
FIG. 6a is an illustrative flowchart showing an initial network setup process in accordance with an example embodiment; and, FIG. 6b is an illustrative flowchart showing how a message is relayed through a network from a start node to an end node in accordance with an example embodiment.

FIG. 6a is an illustrative flowchart showing an initial network setup process in accordance with an example embodiment. The flowchart of FIG. 6a assumes that messages will be communicated through a network where a cell will be formed and functional in the inner regions, and a mesh will be formed and function in the outer regions. In accordance with such an example process, it will be appreciated that a protocol may be realized in which a node is aware of what region it is in and uses communication channels accordingly to maximize capacity, reduce delay, and achieve other QoS attributes.

Referring to FIG. 6a, the clustering protocol is initialized in step S602. Then, in step S604, each node with one or more directional antennas is designated a cluster-head. The clustering protocol is run in step S606, creating a cluster around each node identified as having a directional antenna. As noted above, this may be performed by biasing and/or weighting those nodes having at least one directional antenna. Each node periodically may execute a clustering algorithm in which it computes a weight based at least on its current state and any pre-determined biases. The current state may comprise a multitude of parameters, such as, for example, the number of adjacent neighbor nodes, the stability of the link, the processor and memory capacity, etc. The pre-determined biases may include parameters such as, for example, the role of the node in the network, the existence or non-existence of particular software executable on the node, etc. One such embodiment of the biasing parameter could include the existence of a directional antenna, in which case the weighting function would compute a higher weight for the node as compared to a similar node lacking a directional antenna. These weights may be exchanged by the nodes, and a selection process may follow in which the node with the highest weight in its immediate vicinity becomes a clusterhead node.

Figure 6B:
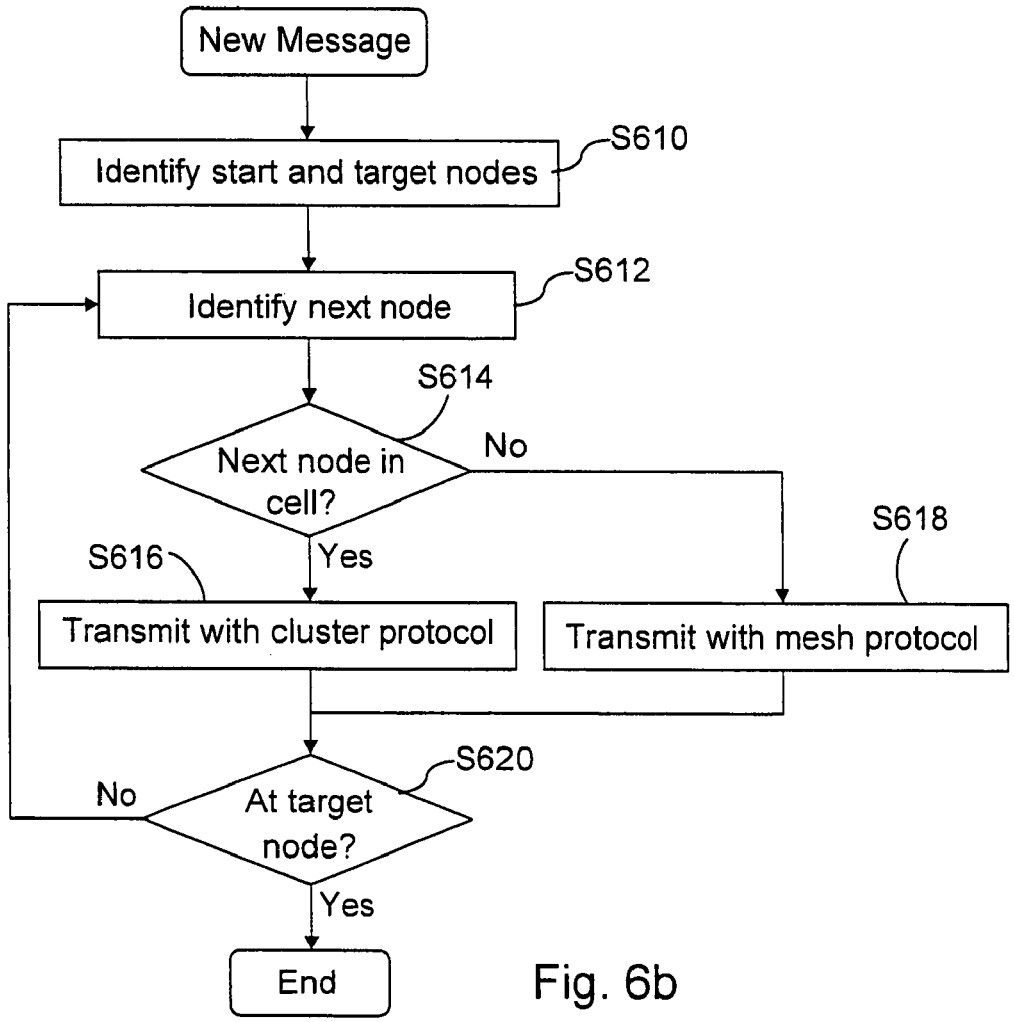

FIG. 6b is an illustrative flowchart showing how a message is relayed through a network from a start node to a target node in accordance with an example embodiment. The start and target nodes are identified in step S610. The next node that the message should be sent to is identified in step S612. Step S614 determines whether the next node is within the same cell. As described above, the relative locations of nodes may be known, with the routing at the node level preferably being handled by the primitives executable thereon. If it is within the same cell, the message is transmitted to the next node directly if it is within radio communication range, or via the clusterhead if it is not, as reflected in step S616. However, if the result of step S614 indicates that the next node is not in the cell, the message is transmitted using the mesh protocol, as reflected in step S618. In either case, step S620 determines whether the message has reached the target node. If it has, communications are ended. If the message has not reached the target node, the process returns to step S612, and continues communications operations in the above-described manner.

Although not explicitly described above, it will be appreciated that in certain example embodiments, all nodes in the network may be configured in the same or a similar fashion. In such cases, cluster-heads may be chosen in the same way as described above, with one difference between the above-described embodiments and this example configuration being the homogeneity of antennas on all nodes (e.g. all nodes may have omni-directional antennas, all nodes may have directional antennas, etc.). Where different nodes are disposed throughout the network, portable nodes may be further classified as being light, medium, or heavy. Thus, in certain example embodiments, portable nodes may be provided such that light portable nodes (e.g. nodes configured to implement only the mesh protocol) and medium portable nodes (e.g. nodes configured to implement both mesh and mesh-to-cluster protocols) in addition to cluster-head nodes are provided. As a general case, cluster-head nodes may have some unique way of communicating with nodes in a cell. Thus, the above description where cluster-head nodes have associated directional antennas is merely one example case of such a unique way of communicating with nodes. It will be appreciated that other unique ways of communicating may be provided in certain other example embodiments.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments.

What is claimed is:

1. A method of sending a message through a network of nodes, wherein each node in a first subset of nodes includes at least one directional antenna, and each node in a second subset of nodes includes an omni-directional antenna, the method comprising:
   identifying as a cluster-head each node in the first subset of nodes;
   clustering into a cell those nodes in the second subset of nodes that are proximate to each cluster-head;
   creating a mesh, the mesh including nodes remote from each cluster-head;
   defining a transition region between the cell and the mesh, the transition region incorporating at least one node of the cell and at least one node of the mesh; and
   sending the message from a sending node via the cell and/or the mesh in dependence on whether the sending node is a cluster-head type node,
   wherein nodes in the cell communicate according to a first protocol and nodes in the mesh communicate according to a second protocol,
   wherein the nodes in the transition region are configured to facilitate changes between communications according to the first and second protocols, and
   wherein at least one node in the cell is not in the mesh, and at least one node in the mesh is not in the cell.

2. The method of claim 1, further comprising:
   sending the message through the cell when the sending node is a cluster-head and the node receiving the message is within the cell; and,
   sending the message using the mesh when the sending node is not a cluster-head or the node receiving the message is not within the cell.

3. The method of claim 1, further comprising identifying at least a location of the node receiving the message relative to node sending the message.

4. The method of claim 3, further comprising executing primitives stored on the node sending the message to identify the location of the node receiving the message.

5. The method of claim 4, further comprising:
   detecting an exception case; and,
   using the primitives to handle the exception case.

6. The method of claim 4, further comprising using the primitives to instruct the node executing the primitives to ignore the message when the message is inappropriately received.

7. The method of claim 1, wherein a first set of channels are used for communications in the cell, and a second set of channels are used for communications in the mesh.

8. The method of claim 1, wherein a set of channels are used in for communications in the mesh, and the set of channels are reused for communications in the mesh.

9. The method of claim 1, wherein nodes in the mesh are operable to transmit and/or receive signals simultaneously.

10. The method of claim 9, further comprising when a node inappropriately receives a message, ignoring the message.

11. A system for sending a message through a network of nodes, comprising:
   a first subset of nodes, each node in the first subset of nodes including at least one directional antenna and being identified as a cluster-head node;
   a second subset of nodes, each node in the second subset of nodes including an omni- directional antenna;
   at least one cell region, each cell comprising a cluster-head node and a cluster of nodes from the second subset of nodes, each node in the cluster being proximate to the cluster-head node;
   at least one mesh region, the mesh including nodes remote from each cluster-head; and
   at least one transition region located between the at least one cell and the at least one mesh, the at least one transition region incorporating at least one node of the at least one cell and at least one node of the at least one mesh,
   wherein nodes in the at least one cell communicate according to a first protocol and nodes in the at least one mesh communicate according to a second protocol,
   wherein the nodes in the at least one transition region are configured to facilitate changes between communications according to the first and second protocols,
   wherein at least one node in the at least one cell is not in the at least one mesh, and at least one node in the at least one mesh is not in the at least one cell, and
   wherein the message is sendable from a sending node via the cell and/or the mesh in dependence on whether the sending node is a cluster-head type node.

12. The system of claim 11, wherein each node in the network of nodes includes primitives configured to handle exception cases and/or instruct the node on which the primitives are being executed to ignore the message when the message is inappropriately received.

13. The system of claim 11, wherein the cell region is configured to function on a first set of channels, and the mesh region is configured to function on a second set of channels.

14. The system of claim 11, wherein the cell region and the mesh region are configured to function on a single set of channels.

15. A system for sending a message through a network of nodes, comprising at least one cell region and at least one mesh region, and at least one transition region located between the at least one cell and the at least one mesh, the at least one transition region incorporating at least one node of the at least one cell and at least one node of the at least one mesh wherein:
   each cell region includes:
      a cluster-head node, the cluster-head node having at least one directional antenna operable to send and/or receive the message directly to at least one cell node, the at least one cell node having an omni-directional antenna;
      wherein the cell region is formable in accordance with a clustering algorithm that clusters the at least one cell node around the cluster-head node;
   each mesh region includes:
      at least one mesh node operable to send and/or receive a message, the at least one mesh node having an omni-directional antenna;
      wherein the at least one mesh node is located remote from the cluster-head node of the cell region;
   wherein each node in the network of nodes is configured to execute primitives, the primitives being configured at least to identify a node to which the message should be sent and whether the message should be sent through the cell region or the mesh region,
   wherein nodes in the at least one cell communicate according to a first protocol and nodes in the at least one mesh communicate according to a second protocol,
   wherein the nodes in the at least one transition region are configured to facilitate changes between communications according to the first and second protocols, and
   wherein at least one node in the at least one cell is not in the at least one mesh, and at least one node in the at least one mesh is not in the at least one cell.

16. A system for sending a message through a network of nodes, wherein each node in a first subset of nodes includes at least one directional antenna, and each node in a second subset of nodes includes an omni-directional antenna, comprising:
   means for identifying as a cluster-head each node in the first subset of nodes;
   means for clustering into a cell those nodes in the second subset of nodes that are proximate to each cluster-head;
   means for creating a mesh, the mesh including nodes remote from each cluster-head;
   means for defining a transition region between the cell and the mesh, the transition region incorporating at least one node of the cell and at least one node of the mesh; and
   means for sending the message from a sending node via the cell and/or the mesh in dependence on whether the sending node is a cluster-head type node,
   wherein nodes in the cell communicate according to a first protocol and nodes in the mesh communicate according to a second protocol,
   wherein the nodes in the transition region are configured to facilitate changes between communications according to the first and second protocols, and
   wherein at least one node in the cell is not in the mesh, and at least one node in the mesh is not in the cell.

* * * * *